US012237663B2

United States Patent
Liu et al.

(10) Patent No.: US 12,237,663 B2
(45) Date of Patent: Feb. 25, 2025

(54) LINE PROTECTION METHOD AND RELATED APPARATUS FOR FLEXIBLE GROUNDING SYSTEM OF POWER DISTRIBUTION NETWORK

(71) Applicant: Electric Power Research Institute of Yunnan Power Grid Co., Ltd, Yunnan (CN)

(72) Inventors: Hongwen Liu, Yunnan (CN); Xianping Zhao, Yunnan (CN); Jindong Yang, Yunnan (CN); Chenchao Chai, Yunnan (CN); Lijun Tang, Yunnan (CN); Ding Nie, Yunnan (CN); Quancong Zhu, Yunnan (CN); Yongjie Nie, Yunnan (CN); Dexu Zou, Yunnan (CN); Shaolei Zhai, Yunnan (CN); Zhilei Zhang, Yunnan (CN)

(73) Assignee: Electric Power Research Institute of Yunnan Power Grid Co., Ltd, Yunnan (CN)

(*) Notice: Subject to any disclaimer, the term of this patent is extended or adjusted under 35 U.S.C. 154(b) by 249 days.

(21) Appl. No.: 18/181,482

(22) Filed: Mar. 9, 2023

(65) Prior Publication Data
US 2023/0361552 A1 Nov. 9, 2023

Related U.S. Application Data

(63) Continuation of application No. PCT/CN2022/124233, filed on Oct. 10, 2022.

(30) Foreign Application Priority Data

May 7, 2022 (CN) .......................... 202210492798.0

(51) Int. Cl.
H02H 3/16 (2006.01)
H02H 3/00 (2006.01)
H02H 7/28 (2006.01)

(52) U.S. Cl.
CPC ............ H02H 3/165 (2013.01); H02H 3/006 (2013.01); H02H 7/28 (2013.01)

(58) Field of Classification Search
CPC ........ H02H 3/402; H02H 3/165; H02H 3/081; H02H 3/34; H02H 3/00; H02H 3/162;
(Continued)

(56) References Cited

U.S. PATENT DOCUMENTS

2017/0227595 A1   8/2017   Xu et al.
2017/0227611 A1*  8/2017   Xu ......................... G01R 31/40

FOREIGN PATENT DOCUMENTS

CN   102074950   5/2011
CN   109713654   5/2019
(Continued)

OTHER PUBLICATIONS

"International Search Report (Form PCT/ISA/210) of PCT/CN2022/124233," mailed on Dec. 22, 2022, pp. 1-4.
"Written Opinion of the International Searching Authority (Form PCT/ISA/237) of PCT/CN2022/124233", mailed on Dec. 22, 2022, pp. 1-5.

Primary Examiner — Bryan R Perez
(74) Attorney, Agent, or Firm — JCIPRNET

(57) ABSTRACT

The embodiments of the present invention disclose a line protection method and a related apparatus for a flexible grounding system of a power distribution network. The method comprises outputting a first compensation voltage by a voltage source of a flexible grounding device of each line of a target power distribution network in the case where a ground fault occurs in the target power distribution network; starting to calculate the zero-sequence impedance of each line in real time by the zero-sequence impedance (Continued)

protection device; after the first compensation voltage is output for a first output duration, outputting a second compensation voltage; calculating the zero-sequence impedance of each line in real time by the line zero-sequence impedance protection device; determining a fault line by the zero-sequence impedance protection device, and cutting off the fault line to isolate the ground fault after a trip for a preset time delay.

17 Claims, 5 Drawing Sheets

(58) Field of Classification Search
CPC .......... H02H 3/40; H02H 3/006; H02H 3/042; H02H 3/044; H02H 3/105; H02H 7/26; H02H 7/262; H02H 7/267; H02H 9/08; H02H 9/002; H02H 9/02
See application file for complete search history.

(56) References Cited

FOREIGN PATENT DOCUMENTS

| | | |
|---|---|---|
| CN | 112557829 | 3/2021 |
| CN | 113484665 | 10/2021 |
| CN | 114660505 | 6/2022 |
| CN | 114825309 | 7/2022 |

* cited by examiner

LINE PROTECTION METHOD AND RELATED APPARATUS FOR FLEXIBLE GROUNDING SYSTEM OF POWER DISTRIBUTION NETWORK

CROSS-REFERENCE TO RELATED APPLICATION

This application is a continuation of international PCT application serial no. PCT/CN2022/124233, filed on Oct. 10, 2022, which claims the priority benefit of China application no. 202210492798.0, filed on May 7, 2022. The entirety of each of the above mentioned patent applications is hereby incorporated by reference herein and made a part of this specification.

TECHNICAL FIELD

The present invention relates to the technical field of flexible grounding protection for distribution networks, and more particularly, to a line protection method and a related apparatus for a flexible grounding system of a power distribution network.

DESCRIPTION OF RELATED ART

The distribution network neutral point flexible grounding via the controllable voltage source has been widely used in power distribution systems at home and abroad, which makes up the shortage that the current arc suppression coil grounding system cannot fully compensate for fault current, and completely eliminates electric shock, mountain fire and other secondary fault risks caused by residual voltage and current at a grounding fault point. The flexible grounding mode of controllable voltage source can flexibly control the amplitude, phase and frequency of the voltage at the fault point, has fast response speed, and can cooperate with FTU of distribution automation circuit breaker to quickly isolate faults.

The active fast and safe disposal of grounding fault is achieved by the neutral point flexible grounding mode of distribution network by the voltage source and current source. However, the flexible grounding mode changes the system neutral point zero-sequence voltage and line zero-sequence current when the arc is extinguished. The conventional zero-sequence current protection and zero-sequence voltage in-situ blocking and isolation technology is not applicable when the flexible power supply is injected. In view of the above-mentioned problems, the present invention uses the principle that the zero-sequence impedance of a fault line changes accordingly and the zero-sequence impedance of a non-fault line is unchanged during arc extinguishing regulation of the flexible voltage source and current source so as to perform ground fault line protection. Also, the method can also be used for a line selection device.

SUMMARY

A series of concepts in simplified forms are introduced in the summary section, which is described in further detail in the detailed description. This summary of the invention is not intended to limit the key features and essential features of the claimed subject matter, nor is it intended to determine the scope of the claimed subject matter.

In order to provide a reliable line protection method for a flexible grounding system of a power distribution network, in a first aspect, the present invention proposes a line protection method for a flexible grounding system of a power distribution network, the method comprising the following steps.

Outputting a first compensation voltage by a voltage source of a flexible grounding device of each line of a target power distribution network in the case where a ground fault occurs in the target power distribution network, wherein the first compensation voltage is opposite to a fault of a voltage corresponding to the ground fault;

Detecting the ground fault by a zero-sequence impedance protection device to calculate the zero-sequence impedance of each line in real time;

After the first compensation voltage is output for a first output duration, adjusting the output voltage by the voltage source of the flexible grounding device to continuously output a second compensation voltage, and exiting from a voltage source compensation mode after it is output for a second output duration;

Calculating the zero-sequence impedance of each line in real time by the zero-sequence impedance protection device, wherein the zero-sequence impedance comprises a maximum zero-sequence impedance and a minimum zero-sequence impedance;

Determining a fault line satisfying a zero-sequence impedance protection condition and a zero-sequence voltage protection condition according to the zero-sequence impedance by the zero-sequence impedance protection device, and cutting off the fault line to isolate the ground fault after a preset trip time delay of a line breaker trips; and When there is no case that the line satisfies the zero-sequence impedance protection condition and the zero-sequence voltage protection condition, continuing to output the first compensation voltage by the voltage source of the flexible grounding device after a preset trip time delay of a line breaker.

Optionally, the calculating the zero-sequence impedance of each line by the zero-sequence impedance protection device further comprises:

calculating the zero-sequence impedance of each line according to a zero-sequence impedance calculation formula by the zero-sequence impedance protection device, wherein the zero-sequence impedance calculation formula is $$Z_{0i} = \text{Mod}\left(\frac{\dot{U}_{0i}}{\dot{I}_{0i}}\right)$$

where $Z_{0i}$ is a zero-sequence impedance value of an $i^{th}$ zero-sequence protection device mounting point; $\dot{U}_{0i}$ is a zero-sequence voltage of the $i^{th}$ zero-sequence protection device mounting point; $\dot{I}_{0i}$ is a zero-sequence current of the $i^{th}$ zero-sequence protection device mounting point; Mod is a modulo function.

Optionally, the adjusting the output voltage by the voltage source of the flexible grounding device to output a second compensation voltage further comprises:

adjusting an amplitude $U_s$ and/or a phase $\psi$ of the output voltage $\dot{U}_s$ by the voltage source of the flexible grounding device to output a second compensation voltage, wherein the second compensation voltage can be a plurality of different voltages in succession;

the determination of the second compensation voltage $\dot{U}_s$ is related to a ground transition impedance $Z_{ABC}$ and an impedance change amount protection constant value $Z_{zd}$; $\dot{U}_{ABC}$ is a fault phase power supply voltage; C is a fault line to ground capacitance; ‖ is an absolute value; and the impedance change amount protection constant value $Z_{zd}$ is determined by:

$$Z_{zd} = \left| \mathrm{Mod}\left(\frac{3\dot{U}_s Z_{ABC}}{3\dot{U}_s + 2j\omega C \dot{U}_s Z_{ABC} + 3\dot{U}_{ABC} - \dot{U}_{ABC} Z_{ABC}}\right) - \mathrm{Mod}\left(\frac{1}{j\omega C}\right) \right|$$

Optionally, the zero-sequence impedance protection condition is that a zero-sequence impedance deviation $\Delta Z$ during the first duration and the second duration is greater than or equal to an impedance variation protection constant value $Z_{zd}$, wherein the zero-sequence impedance deviation $\Delta Z$ is a difference between the maximum zero-sequence impedance and the minimum zero-sequence impedance;

The zero-sequence voltage protection condition is an obtained zero-sequence voltage setting value $U_{0z}$ measured when it exits from the voltage source compensation mode.

Optionally, the impedance change amount protection constant value $Z_{zd}$ is set based on the sensitivity of the isolated fault, wherein the impedance change protection constant value $Z_{zd}$ is determined based on the transition impedance $Z_{ABC}$ to be detected.

Optionally, the zero-sequence voltage setting value $U_{0z}$ is greater than 8V.

Optionally, the preset trip time delay is determined based on the mounting location of the zero-sequence impedance protection device in the line, the preset trip time delay of the zero-sequence impedance protection device closer to a bus bar being greater than the preset trip time delay of the zero-sequence impedance protection device away from the bus bar, the preset trip time delay differential being greater than or equal to 0.1 seconds.

Optionally, the preset compensation time delay is greater than the preset trip time delay.

In a second aspect, the present invention also provides a line protection related apparatus for a flexible grounding system of a power distribution network. The device can implement the flexible grounding protection method of the power distribution network of any one of the first aspect and comprises a flexible grounding device and a zero-sequence impedance protection device.

Optionally, the zero-sequence impedance protection device comprises a voltage sensor unit, a current sensing unit, a control calculation unit and a trip unit, wherein the voltage sensing unit is used for converting a high-voltage voltage into signals such as a low-voltage voltage, a current and a frequency for collection and calculation; the current sensing unit is used for converting a high-voltage zero-sequence current into signals such as a low-voltage voltage, a current and a frequency for acquisition and calculation; the control calculation unit is used for calculating a line zero-sequence impedance value and a difference between a maximum value and a minimum value of a zero-sequence impedance value and determining whether to trip; and the trip unit controls a circuit breaker to close or break according to an instruction from the control calculation unit.

In a third aspect, the invention also provides an electronic device, including a storage device, a processor and a computer program stored in the memory and running on the processor. The processor is used to execute the computer program stored in the memory to realize the steps of the flexible grounding protection method of the distribution network as described in any one of the first aspect.

In a fourth aspect, the invention also provides a computer readable storage medium having stored thereon a computer program, wherein the computer program, when executed by a processor, implements the flexible grounding protection method of the power distribution network of any one of the first aspect.

The applied embodiments of the present invention have the following advantageous effects.

The method for line protection of a flexible grounding system of a power distribution network provided in the present application uses the characteristics that the zero-sequence impedance of the non-fault line does not change with the output voltage of a flexible controllable voltage source, and the zero-sequence impedance of the fault line changes with the output voltage of the flexible controllable voltage source, so as to ensure the sensitivity, selectivity, reliability and fault rapid isolation of line circuit breaker protection, reduce the fault power failure range and improve the power supply reliability. This method has higher sensitivity, selectivity and reliability over current active power and zero-sequence current protection, and can quickly isolate ground faults below 20 kΩ. At the same time, it solves the problem that the feeder automatic circuit breaker is difficult to be protected by the zero-sequence voltage and the zero-sequence current in a manner of flexible grounding of the distribution network via the controllable voltage source, without judging the power direction, which provides a ground fault protection method for the distribution automatic circuit breaker (FTU). The ground fault protection method of the power distribution automatic circuit breaker provided by the present invention is beneficial to quickly remove a permanent fault, improve power supply reliability, facilitate the consumption of clean energy and the construction of a new power distribution system. In addition, it solves the problem of line selection during ground fault arc extinguishing under the mode of flexible voltage source and current source grounding, so that precise line selection can be realized during flexible power supply regulation.

In order to more clearly describe the technical solutions in the embodiments of the invention or the prior art, the drawings to be used in the description of the embodiments or the prior art will be briefly introduced below. It will be apparent to those skilled in the art that the drawings in the following description are only some of the invention, and that other drawings may be obtained from the drawings without any creative works.

DESCRIPTION OF THE EMBODIMENTS

The technical solutions in the embodiments of the invention will be described clearly and completely in conjunction with the accompanying drawings in the embodiments of the invention. Obviously, the described embodiments are only part of the embodiments of the invention, rather than all of the embodiments. Based on the embodiments in the invention, all other embodiments obtained by a person skilled in the art without involving any inventive effort are within the scope of protection of the invention.

The terms "first", "second", "third", "fourth", and the like in the description and claims of the present application and in the above-described figures, if any, are used for distinguishing between similar objects and not necessarily for describing a particular sequential or chronological order. It should be understood that the data so used are interchangeable under appropriate circumstances such that the embodiments described herein can be implemented in other sequences than illustrated or described herein. Furthermore, the terms "comprise" and "comprising", as well as any variations thereof, are intended to cover a non-exclusive inclusion. For example, a process, a method, a system, an article, or a device that comprises a list of steps or elements is not necessarily limited to those steps or elements expressly listed, but may include other steps or elements not expressly listed or inherent to such process, method, article, or device. The technical solutions in the embodiments of the application will be described clearly and completely in conjunction with the accompanying drawings in the embodiments of the application. Obviously, the described embodiments are only part of the embodiments of the application, rather than all of the embodiments.

Figure 1:
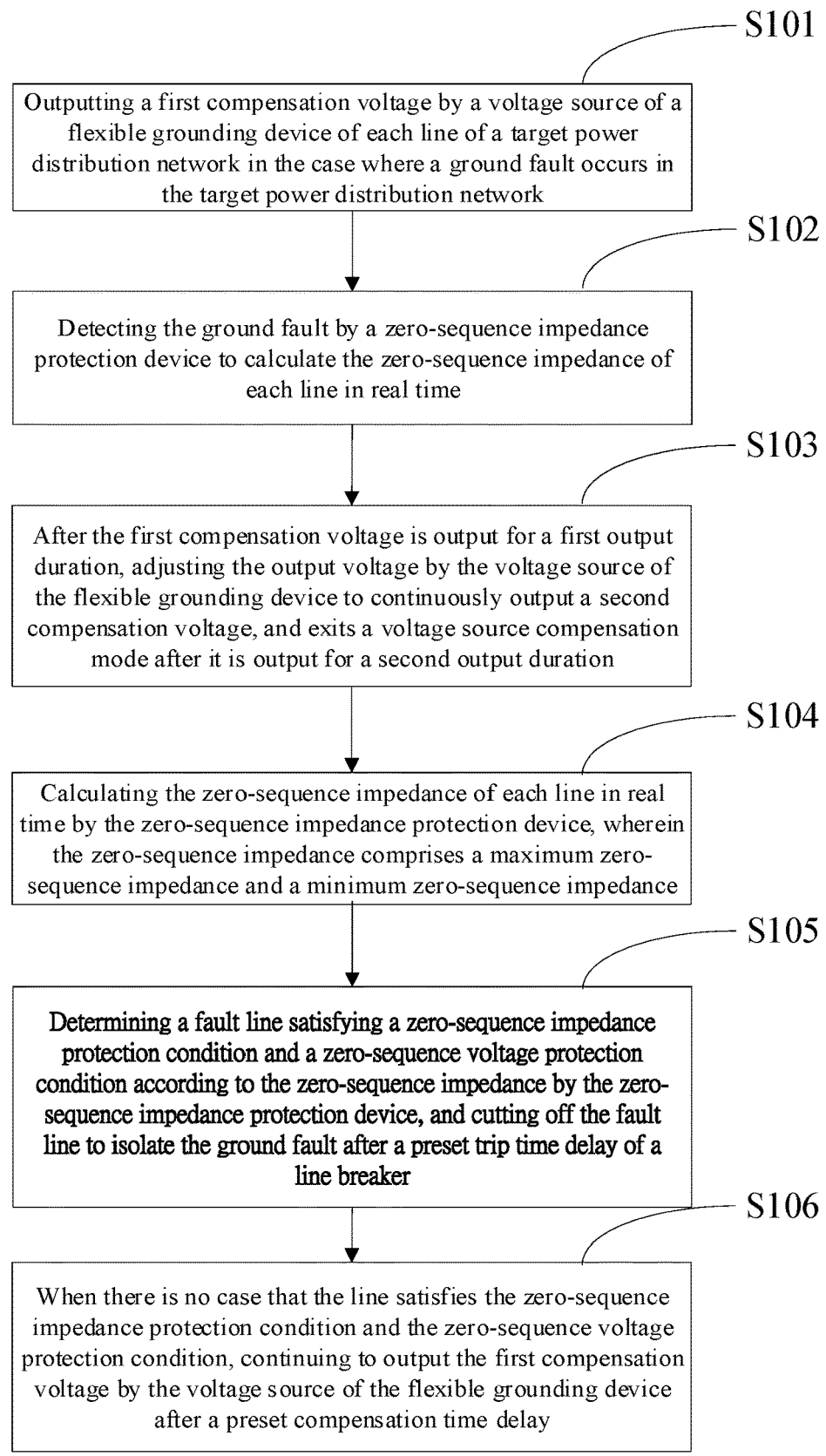
FIG. 1 is a schematic flow chart of a flexible grounding protection method for a power distribution network provided by an embodiment of the present application.

With reference to FIG. 1, it is a schematic flow chart of a flexible grounding protection method for a power distribution network provided by an embodiment of the present application, specifically including:

S101, outputting a first compensation voltage by a voltage source of a flexible grounding device of each line of a target power distribution network in the case where a ground fault occurs in the target power distribution network, wherein the first compensation voltage is opposite to a fault of a voltage corresponding to the ground fault;

S102, detecting the ground fault by a zero-sequence impedance protection device to calculate the zero-sequence impedance of each line in real time;

S103, after the first compensation voltage is output for a first output duration, adjusting the output voltage by the voltage source of the flexible grounding device to continuously output a second compensation voltage, and exiting from a voltage source compensation mode after it is output for a second output duration;

S104, calculating the zero-sequence impedance of each line in real time by the zero-sequence impedance protection device, wherein the zero-sequence impedance comprises a maximum zero-sequence impedance and a minimum zero-sequence impedance;

S105, determining a fault line satisfying a zero-sequence impedance protection condition and a zero-sequence voltage protection condition according to the zero-sequence impedance by the zero-sequence impedance protection device, and cutting off the fault line to isolate the ground fault after a preset trip time delay of a line breaker trips; and S106, when there is no case that the line satisfies the zero-sequence impedance protection condition and the zero-sequence voltage protection condition, continuing to output the first compensation voltage by the voltage source of the flexible grounding device after a preset compensation time delay.

Specifically, in the case where it is detected that a ground fault occurs in the target power distribution network, the voltage source of the flexible grounding device in each line in the target power distribution network outputs a first compensation voltage which is opposite to the fault of the voltage corresponding to the above-mentioned ground fault, so as to achieve line full compensation. Meanwhile, when the zero-sequence impedance protection device detects a ground fault, it starts to calculate the zero-sequence impedance of the protection device mounting point in real time. After the first compensation voltage compensates for a first output duration t, the voltage source of the flexible grounding device adjusts the output voltage to continuously output the second compensation voltage, and it exits from the voltage source compensation mode after outputting a second output duration ts. The zero-sequence impedance protection device calculates the zero-sequence impedance in the first output duration and the second output duration in each line in real time, the zero-sequence impedance including a maximum zero-sequence impedance and a minimum zero-sequence impedance. If the zero-sequence impedance protection device detects that the line meeting the two conditions of the zero-sequence impedance protection condition and the zero-sequence voltage protection condition is a fault line, the zero-sequence impedance protection device cuts off the fault line after a preset trip time delay of the circuit breaker trips to isolate the ground fault. When there is no case that the line satisfies the zero-sequence impedance protection condition and the zero-sequence voltage protection condition, the voltage source of the flexible grounding device continues to output the first compensation voltage to continue to fully compensate after compensating for the preset time delay.

Figure 2:
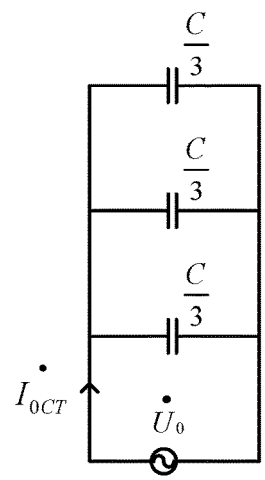
FIG. 2 is a simplified circuit diagram of non-fault line impedance analysis for a neutral point flexible grounding system according to an embodiment of the present application.

Furthermore, the principle of determining a fault line by using the above-mentioned method to is that FIG. 2 is a simplified analytical loop for the non-fault line impedance of the neutral point flexible compensation system. Referring to FIG. 2, it shows a change in the variation $\Delta U_s$ of the voltage output of the flexible grounding device, $U_0 = U_s + \Delta U_s$. $\dot{I}_{0CT}$ varies linearly. The equivalent impedance $Z_0$ of the non-faulty line is unchanged. See Equation (1) below:

$$Z_0 = \frac{\dot{U}_s}{\dot{I}_{0CT}} = \frac{1}{j\omega C} \tag{1}$$

$\dot{U}_0 \; \dot{U}_S \; \dot{U}_A \; \dot{U}_B \; \dot{U}_C \; \dot{I}_{0A} \dot{I}_{0B} \; \dot{I}_{0C}$ where $Z_0$ is a zero-sequence impedance of the non-fault line; $\dot{U}_s$ is a output voltage of the flexible grounding device; $\dot{U}_0$ is a system neutral point zero-sequence voltage; $\dot{I}_{0CT}$ is a zero-sequence current of the non-fault line; C is a distributed capacitance to ground of the non-faulty line.

Figure 3:
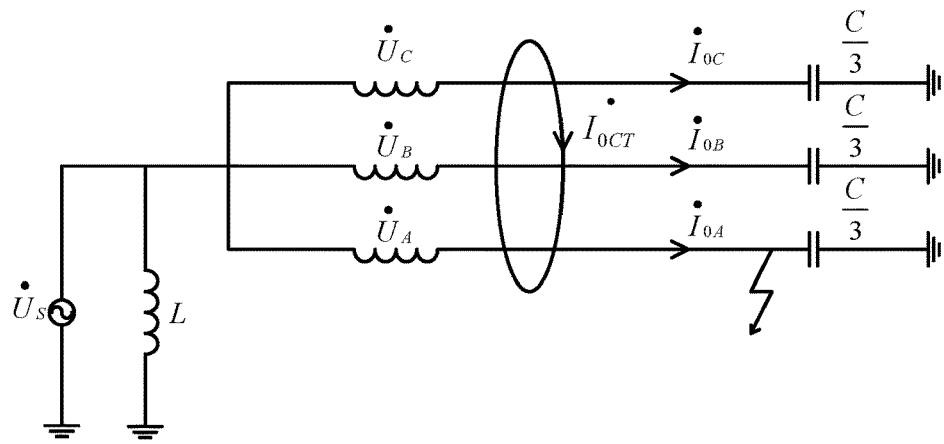
FIG. 3 is a schematic diagram of electrical connection of a fault line of a neutral point flexible grounding system according to an embodiment of the present application.
Figure 4:
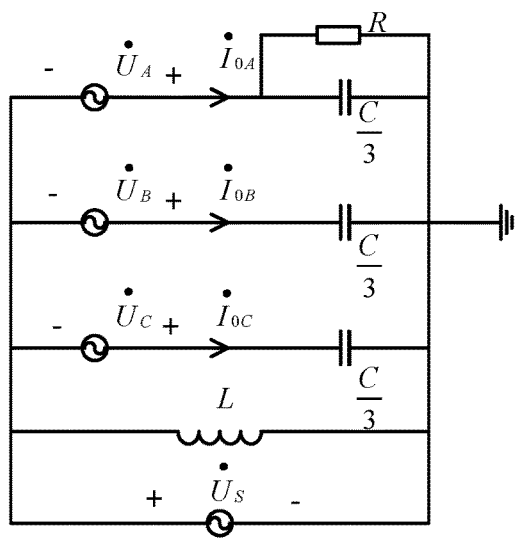
FIG. 4 is a simplified circuit diagram for analyzing fault line impedance of a neutral point flexible grounding system according to an embodiment of the present application.
Figure 5:
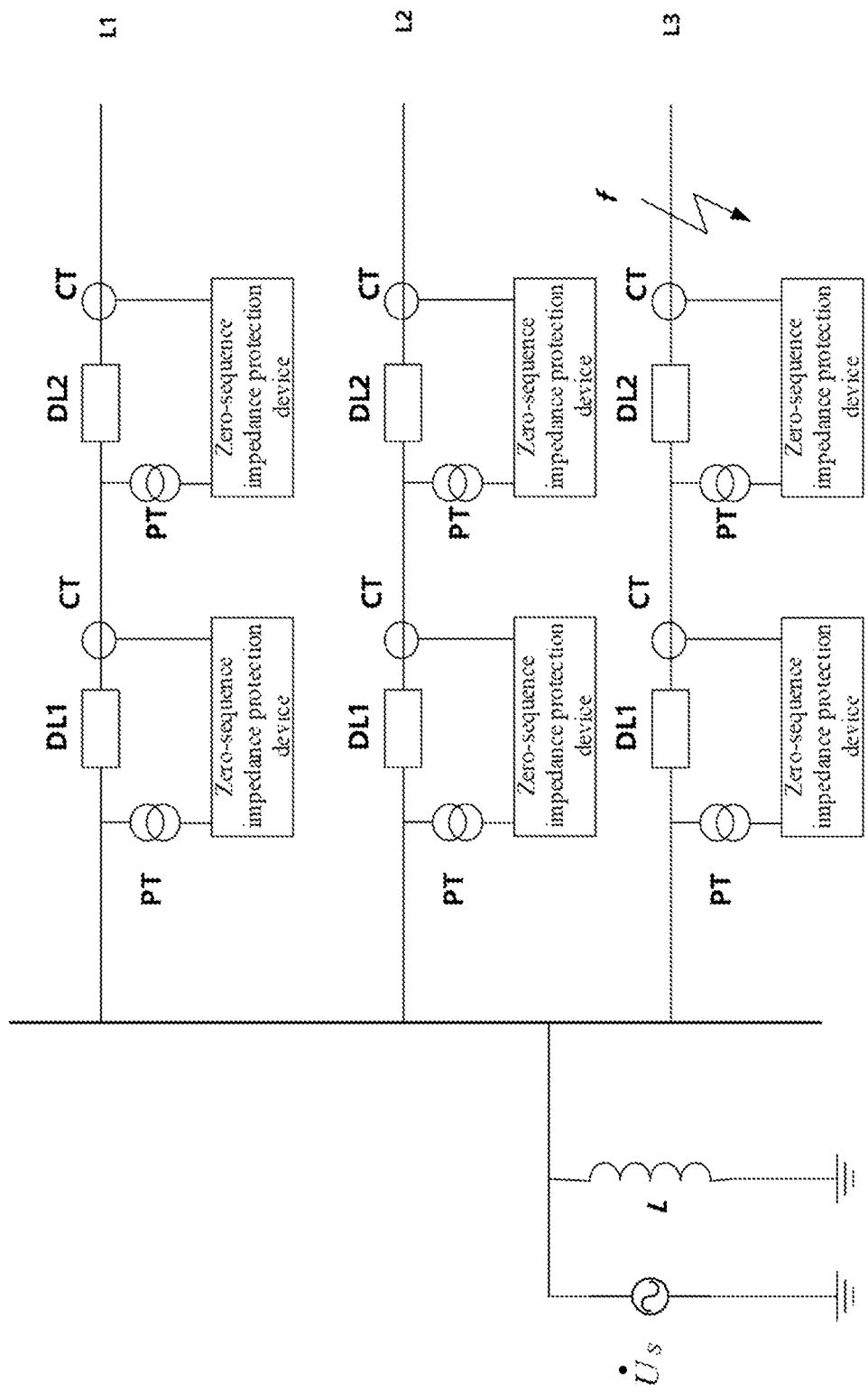
FIG. 5 is a schematic diagram showing the arrangement of a flexible grounding zero-sequence impedance protection device for a power distribution network along a line according to an embodiment of the present application.

With reference to FIG. 3 which is an electrical wiring diagram of a fault line of the neutral point flexible compensation system and FIG. 4 which is a simplified analysis loop of a fault line impedance of the neutral point flexible compensation system, the zero-sequence current of the line is $I_{0CT}=I_{0A}+I_{0S}+I_{0C}$ for a fault line. The non-fault phases including the B-phase current and the C-phase current are $$\dot{I}_{0B} = \frac{j\omega C}{3}\left(\dot{U}_B + \dot{U}_S\right), \dot{I}_{0C} = \frac{j\omega C}{3}\left(\dot{U}_C + \dot{U}_S\right),$$

respectively. The fault phase A phase current is $$\dot{I}_{0A} = \frac{1}{Z_A}\left(\dot{U}_A + \dot{U}_S\right),$$

where $Z_A$ is a parallel impedance between the line-to-ground distributed capacitance C/3 and the ground transition resistance R when the A phase fault occurs, namely, If the flexible ground voltage source outputs a voltage opposite to the fault $U_S=-U_A$, the ground fault current is fully compensated, $I_{0A}=0$. Therefore, $$\dot{I}_{0CT} = \dot{I}_{0A} + \dot{I}_{0B} + \dot{I}_{0C} = \frac{j\omega C}{3}\left(\dot{U}_C + \dot{U}_B + 2\dot{U}_s\right),$$

the supply voltages $\dot{U}_A$, $\dot{U}_B$, $\dot{U}_C$ are symmetrical, $\dot{U}_A+\dot{U}_B+\dot{U}_C=0$, and then $\dot{I}_{0CT}=-j\omega C\dot{U}_s$.

When the flexible grounding system is fully compensated, the zero-sequence impedance of the fault line is $$Z_0 = \frac{\dot{U}_s}{\dot{I}_{0CT}} = \frac{1}{-j\omega C}$$

When the flexible ground voltage source changes the output voltage, there is $U_S \neq -U_A$. Therefore, $$\dot{I}_{0CT} = \dot{I}_{0A} + \dot{I}_{0B} + \dot{I}_{0C} = \frac{j\omega C}{3}\left(\dot{U}_C + \dot{U}_B + 2\dot{U}_s\right) + \frac{\dot{U}_A + \dot{U}_s}{Z_A} \quad (2)$$

$$\text{then } \dot{I}_{0CT} = \dot{U}_s\left(\frac{j\omega C}{3} + \frac{1}{Z_A}\right) + \dot{U}_A\left(\frac{1}{Z_A} - \frac{j\omega C}{3}\right)$$

It is further obtained that the zero-sequence impedance of the neutral point flexible grounding system is $$Z_0 = \frac{\dot{U}_s}{\dot{I}_{0CT}} = \frac{3\dot{U}_s Z_A}{3\dot{U}_s + 2j\omega C \dot{U}_s Z_A + 3\dot{U}_A - \dot{U}_A Z_A} \quad (3)$$

It can be seen from Equation (3) that the zero-sequence impedance of the fault line is controlled by $\dot{U}_S$. Thus, the zero-sequence impedance of the fault line can be changed by changing the output voltage of the flexible grounding device. Further, the fault line can be determined by calculating the deviation between the maximum value and the minimum value of the zero-sequence impedance.

The impedance variation protects the calculation of the constant value $Z_{zd}$. If the zero-sequence impedance value $Z_0$ detected by the zero-sequence CT and PT of the zero-sequence impedance protection device has an error of 0.05Ω, the fully compensated zero-sequence impedance is $$Z_0 = \frac{\dot{U}_s}{\dot{I}_{0CT}} = \frac{1}{-j\omega C}.$$

It needs to detect the impedance variation greater than the error of 0.05Ω. It is assumed that the setting value is $Z_{zd}=0.1\Omega$. Thus, the output voltage of $\dot{U}_S$ is given by:

$$Z_{zd} = \left\|\frac{3\dot{U}_s Z_A}{3\dot{U}_s + 2j\omega C \dot{U}_s Z_A + 3\dot{U}_A - \dot{U}_A Z_A}\right| - \left|\frac{1}{j\omega C}\right|\right\| = 0.1$$

$$Z_{zd} = \left|\text{Mod}\left(\frac{3\dot{U}_s Z_A}{3\dot{U}_s + 2j\omega C \dot{U}_s Z_A + 3\dot{U}_A - \dot{U}_A Z_A}\right) - \text{Mod}\left(\frac{1}{j\omega C}\right)\right| = 0.1$$

$\dot{U}_S$ to be adjusted can be determined from the above-mentioned equation.

In summary, the zero-sequence impedance protection method for a flexible grounding system of a power distribution network provided in the present application uses the characteristics that the zero-sequence impedance of the non-fault line does not change with the output voltage of a flexible controllable voltage source, and the zero-sequence impedance of the fault line changes with the output voltage of the flexible controllable voltage source, so as to ensure the sensitivity, selectivity, reliability and fault rapid isolation of line circuit breaker protection, reduce the fault power failure range and improve the power supply reliability. This method has higher sensitivity, selectivity and reliability over the current protection method for the line active power and zero-sequence current, and can quickly isolate ground faults below 20 kΩ. At the same time, it solves the problem that the feeder automatic circuit breaker is difficult to be protected by the zero-sequence voltage and the zero-sequence current in a manner of flexible grounding of the distribution network via the controllable voltage source, without judging the power direction, which provides a ground fault protection method for the distribution automatic circuit breaker (FTU). The ground fault protection method of the power distribution automatic circuit breaker provided by the present invention is beneficial to quickly remove a permanent fault, improve power supply reliability, facilitate the consumption of clean energy and the construction of a new power distribution system. In addition, it solves the problem of line selection during ground fault arc extinguishing under the mode of flexible voltage source and current source grounding, so that precise line selection can be realized during flexible power supply regulation.

In some embodiments, the calculating the zero-sequence impedance of each line by the zero-sequence impedance protection device further includes:

The zero-sequence impedance protection device calculates the zero-sequence impedance of each line according to a zero-sequence impedance calculation formula. The zero-sequence impedance calculation formula is Equation (4):

$$Z_{0i} = \text{Mod}\left(\frac{\dot{U}_{0i}}{\dot{I}_{0i}}\right) \quad (4)$$

where $Z_{0i}$, is a zero-sequence impedance value of an $i^{th}$ zero-sequence protection device mounting point; $\dot{U}_{0i}$ is a zero-sequence voltage of the $i^{th}$ zero-sequence protection device mounting point; $\dot{I}_{0i}$ is a zero-sequence current of the $i^{th}$ zero-sequence protection device mounting point; Mod is a modulo function.

In some embodiments, the adjusting the output voltage by the voltage source of the flexible grounding device to output a second compensation voltage further includes:
adjusting an amplitude $U_s$ and/or a phase $\psi$ of the output voltage $\dot{U}_s$ by the voltage source of the flexible grounding device to output a second compensation voltage, wherein the second compensation voltage can be a plurality of different voltages in succession;
the determination of the second compensation voltage $\dot{U}_s$ is related to a ground transition impedance $Z_{ABC}$ and an impedance change amount protection constant value $Z_{zd}$; $\dot{U}_{ABC}$ is a fault phase power supply voltage; C is a fault line to ground capacitance; $\|$ is an absolute value; and the impedance change amount protection constant value $Z_{zd}$ is determined by:

$$Z_{zd} = \left|\text{Mod}\left(\frac{3\dot{U}_s Z_{ABC}}{3\dot{U}_s + 2j\omega C \dot{U}_s Z_{ABC} + 3\dot{U}_{ABC} - \dot{U}_{ABC} Z_{ABC}}\right) - \text{Mod}\left(\frac{1}{j\omega C}\right)\right|$$

In some embodiments, the zero-sequence impedance protection condition is that a zero-sequence impedance deviation $\Delta Z$ during the first duration and the second duration is greater than or equal to an impedance variation protection constant value $Z_{zd}$, wherein the zero-sequence impedance deviation $\Delta Z$ is a difference between the maximum zero-sequence impedance and the minimum zero-sequence impedance.

The zero-sequence voltage protection condition is an obtained zero-sequence voltage setting value $U_{Oz}$ measured when it exits from the voltage source compensation mode.

Specifically, if a zero-sequence impedance protection condition and a zero-sequence voltage protection condition exist in a zero-sequence parameter of a line, the line satisfying these two conditions is a fault line. The zero-sequence impedance protection condition is that a zero-sequence impedance deviation $\Delta Z$ is greater than or equal to the impedance change protection constant value $Z_{zd}$ during the process from the start of the fault occurrence to the output of the second compensation voltage (namely, within the first duration and the above-mentioned second duration). The zero-sequence impedance deviation $\Delta Z$ is a difference between the maximum zero-sequence impedance and the minimum zero-sequence impedance. In addition, the zero-sequence voltage protection condition is an obtained zero-sequence voltage setting value $U_{Oz}$ measured when the zero-sequence voltage protection condition is that it exits from the voltage source compensation mode.

In some embodiments, the impedance change protection constant value $Z_{zd}$ is set based on the sensitivity of the isolated fault, wherein the impedance change protection constant value is determined based on the transition impedance $Z_{ABC}$ to be detected.

Specifically, $Z_{zd}$ can take any value from 0.01 ohms to 1000 ohms.

In some embodiments, the zero-sequence voltage setting value $U_{Oz}$ is greater than 8V.

In some embodiments, the preset trip time delay is determined based on the mounting location of the zero-sequence impedance protection device in the line, the preset trip time delay of the zero-sequence impedance protection device closer to a bus bar being greater than the preset trip time delay of the zero-sequence impedance protection device away from the bus bar, the preset trip time delay differential being greater than or equal to 0.1 seconds.

Specifically, the preset trip time delay is determined according to the mounting position in the line. The preset trip time delay differential can be any value in the range of 0.1 s–10 s. The preset trip delay of the zero-sequence impedance protection device close to the bus bar is greater than the preset trip time delay of the zero-sequence impedance protection device away from the bus bar.

In some embodiments, the compensation preset time delay is greater than the preset trip time delay.

Figure 6:
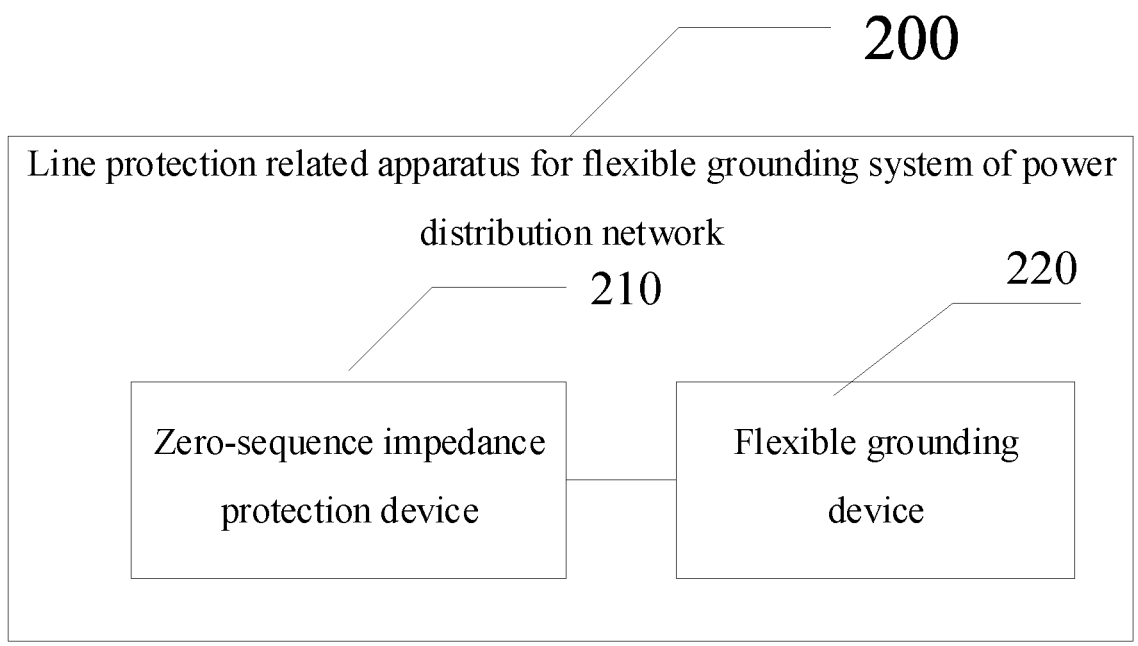
FIG. 6 is a schematic structural diagram of a line protection related apparatus for a flexible grounding system of a power distribution network according to an embodiment of the present application.

With reference to FIG. 6, the present invention also provides a line protection related apparatus 200 for a flexible grounding system of a power distribution network. The device can implement the flexible grounding protection method of the power distribution network of any one of the first aspect and includes a flexible grounding device 220 and a zero-sequence impedance protection device 210.

Figure 7:
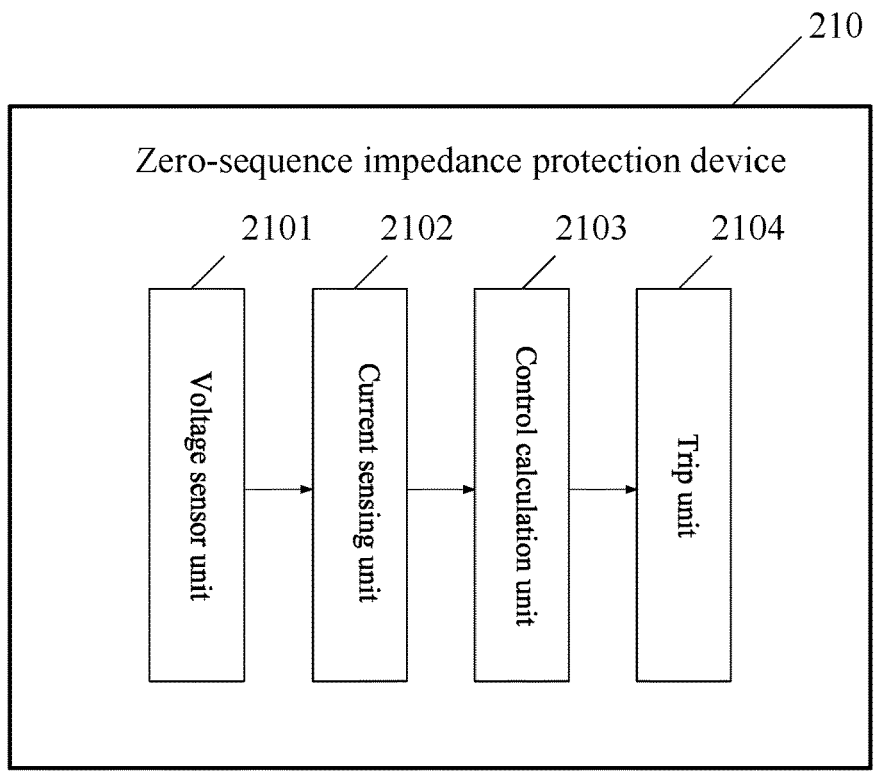
FIG. 7 is a schematic structural diagram of a zero-sequence impedance protection unit according to an embodiment of the present application.

Referring to FIG. 7, the zero-sequence impedance protection device 210 includes a voltage sensor unit 2101, a current sensing unit 2102, a control calculation unit 2103, and a trip unit 2104. The voltage sensing unit 2101 is used for converting a high-voltage voltage into signals such as a low-voltage voltage, a current and a frequency so as to collect and calculate; the above-mentioned current sensing unit 2102 is used for converting a high-voltage zero-sequence current into signals, such as a low-voltage voltage, a current and a frequency for collection and calculation. The control calculation unit 2103 is used for calculating a difference between a zero-sequence impedance value of a line and a maximum value and a minimum value of a zero-sequence impedance value and determining whether to trip. The trip unit 2104 controls a circuit breaker to close or break according to an instruction from the control calculation unit.

Figure 8:
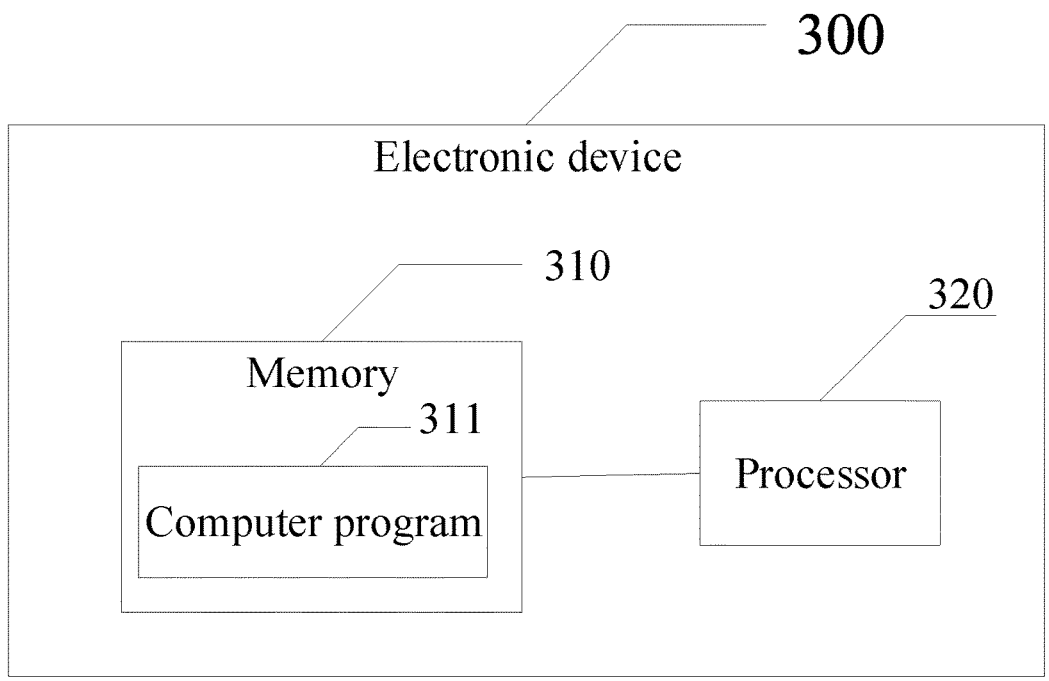
FIG. 8 is a schematic structural diagram of a flexible grounding protection electronic device of a power distribution network according to an embodiment of the present application.

As shown in FIG. 8, embodiments of the present application also provide an electronic device 300 including a memory 310, a processor 320, and a computer program 311 stored on the memory 320 and executable on the processor. The computer program 311 when executed by the processor 320 implements the steps of the methods of temperature control of an outlet of a slot-type solar collector field described above.

Since the electronic device described in the present embodiment is a device used for implementing a temperature control device for the outlet of the slot-type solar collector field in the embodiments of the present application. Therefore, based on the method described in the embodiments of the present application, a person skilled in the art would have been able to learn the particular implementation of the electronic device of the present embodiment and various modifications thereof. Therefore, how to implement the method in the embodiments of the present application by the electronic device is not described in detail herein. Any device used by a person skilled in the art for implementing the method in the embodiments of the present application falls within the scope of protection of the present application.

In a specific implementation, the computer program 311, when executed by the processor, may implement any implementation of the corresponding embodiments of FIG. 1.

It should be noted that in the above-mentioned embodiments, the description of each embodiment has its own emphasis, and parts of one embodiment which are not described in detail may be referred to the description of other embodiments.

Those skilled in the art will appreciate that embodiments of the present application may be provided as a method, a system, or a computer program product. Thus, the present application may take the form of an entire hardware embodiment, an entire software embodiment, or an embodiment combining software and hardware aspects. Moreover, the present application may take the form of a computer program product embodied on one or more computer-usable storage media (including, but not limited to, magnetic disk storage, CD-ROM, optical storage, and the like) having computer-usable program code embodied therein.

The present application is described with reference to flowcharts and/or a block diagrams of methods, devices (systems), and computer program products according to embodiments of the present application. It will be understood that each flow and/or block of the flowcharts and/or block diagrams in combination with flows and/or blocks in the flowcharts and/or block diagrams can be implemented by computer program instructions. These computer program instructions may be provided to a processor of a general purpose computer, a special purpose computer, an embedded computer/other data processing devices to produce a machine, such that the instructions executed via the processor of the computer or other programmable data processing devices create means for implementing the functions specified in the flowchart flow or flows and/or block diagram block or blocks.

These computer program instructions may also be stored in a computer-readable memory that can direct a computer or other programmable data processing devices to function in a particular manner, such that the instructions stored in the computer-readable memory produce an article of manufacture including instruction means which implement the function specified in the flowchart flow or flows and/or block diagram block or blocks.

These computer program instructions may also be loaded onto a computer or other programmable data processing devices to cause a series of operational steps to be performed on the computer or other programmable devices to produce a computer implemented process, such that the instructions executed on the computer or other programmable devices provide steps for implementing the functions specified in the flowchart flow or flows and/or block diagram block or blocks.

Embodiments of the present application also provide a computer program product including computer software instructions which, when run on a processing device, cause the processing device to perform the flow of a flexible grounding protection method for a power distribution network as in the corresponding embodiment of FIG. 1.

The computer program product includes one or more computer instructions. When the computer program instructions are loaded and executed on a computer, it generates, in whole or in part, processes or functions according to embodiments of the present application. The computer may be a general purpose computer, a special purpose computer, a computer network, or other programmable apparatus. The computer instructions may be stored in a computer-readable storage medium or transmitted from one computer-readable storage medium to another computer-readable storage medium. For example, the computer instructions may be transmitted from a website, a computer, a server, or a data center to another website, computer, server, or data center by a wired manner (e.g., coaxial cable, fiber optic, digital subscriber line, DSL) or a wireless manner (e.g., infrared, wireless, microwave, etc.). The computer-readable storage medium can be any available medium that can be used for storage by a computer or a data storage device including a server, data center, or the like integrated by one or more available media. The available medium may be a magnetic medium (e.g., floppy disk, hard disk, magnetic tape), an optical medium (e.g., DVD), or a semiconductor medium (e.g., solid state disk, SSD), etc.

It will be obvious to a person skilled in the art that, for the convenience and brevity of the description, specific working procedures of the above described systems, devices and units may be referred to corresponding procedures in the preceding method embodiments and will not be described in detail here.

In the several embodiments provided herein, it should be understood that the disclosed system, device, and method may be implemented in other ways. For example, the apparatus embodiments described above are merely illustrative. For example, the partitioning of elements is merely a logical function partitioning, and actual implementations may have additional partitioning, e.g., multiple elements or components may be combined or integrated into another system, or some features may be omitted, or not performed. In another aspect, the couplings or direct couplings or communication connections shown or discussed with respect to each other may be indirect couplings or communication connections via some interface, apparatus, or unit, and may be electrical, mechanical, or other forms.

The elements illustrated as separate elements may or may not be physically separate, and the components shown as elements may or may not be physical elements, i.e., may be located at one place, or may be distributed across multiple network elements. Some or all of the elements can be selected according to actual needs to achieve the purpose of the solution of the embodiment.

In addition, each functional unit in each embodiment of the present application may be integrated in one processing unit, or may be physically present separately from each unit. Two or more units may be integrated in one unit. The above-mentioned integrated units may be implemented in the form of hardware or in the form of software functional units.

The integrated unit, if implemented in the form of a software functional unit and sold or used as a stand-alone product, may be stored in a computer-readable storage medium. Based on this understanding, the solution of the application may be essentially or a part of making a contribution to the prior art or a whole or part of the solution may be embodied in the form of a software product that is stored in a storage medium and that includes instructions for causing a computer device (which may be a personal computer, a server, or a network device, etc.) to perform all or part of the steps of the methods of the various embodiments of the present application. The afore mentioned storage medium includes USB flash disk, mobile hard disk drive, read-only memory (ROM), random access memory (RAM), magnetic or optical disk and other various media capable of storing program codes.

The above disclosed are only preferred embodiments of the invention and not intended to limit the scope of the invention. Therefore, equivalent changes made in accordance with the claims of the invention shall remain within the scope of the invention.

What is claimed is:

1. A line protection method for a flexible grounding system of a power distribution network, comprising:

outputting a first compensation voltage by a voltage source of a flexible grounding device of each line of a target power distribution network in the case where a ground fault occurs in the target power distribution network, wherein the first compensation voltage is opposite to a fault of a voltage corresponding to the ground fault;

detecting the ground fault by a zero-sequence impedance protection device to calculate the zero-sequence impedance of each line in real time;

after the first compensation voltage is output for a first output duration, adjusting the output voltage by the voltage source of the flexible grounding device to continuously output a second compensation voltage, and exiting from a voltage source compensation mode after the second compensation voltage is output for a second output duration;

calculating the zero-sequence impedance of each line in real time by the zero-sequence impedance protection device, wherein the zero-sequence impedance comprises a maximum zero-sequence impedance and a minimum zero-sequence impedance;

determining a fault line satisfying a zero-sequence impedance protection condition and a zero-sequence voltage protection condition according to the zero-sequence impedance by the zero-sequence impedance protection device, and cutting off the fault line to isolate the ground fault after a preset trip time delay of a line breaker; and when a case that no case that the line satisfies the zero-sequence impedance protection condition and the zero-sequence voltage protection condition does not exist, the voltage source of the flexible grounding device continues to output the first compensation voltage after a preset compensation time delay.

2. The method according to claim 1, wherein the calculating the zero-sequence impedance of each line by the zero-sequence impedance protection device comprises:

calculating the zero-sequence impedance of each line according to a zero-sequence impedance calculation formula by the zero-sequence impedance protection device, wherein the zero-sequence impedance calculation formula is $$Z_{0i} = \text{Mod}\left(\frac{\dot{U}_{0i}}{\dot{I}_{0i}}\right)$$

where $Z_{0i}$, is a zero-sequence impedance value of an $i^{th}$ zero-sequence protection device mounting point; $\dot{U}_{0i}$ is a zero-sequence voltage of the $i^{th}$ zero-sequence protection device mounting point; $\dot{I}_{0i}$ is a zero-sequence current of the $i^{th}$ zero-sequence protection device mounting point; Mod is a modulo function.

3. The method according to claim 1, wherein the adjusting the output voltage by the voltage source of the flexible grounding device to continuously output the second compensation voltage comprises:

adjusting an amplitude and/or a phase of the output voltage by the voltage source of the flexible grounding device to output the second compensation voltage, wherein the second compensation voltage is a plurality of different voltages in succession;

wherein the determination of the second compensation voltage is related to a ground transition impedance and an impedance change amount protection constant value, wherein the impedance change amount protection constant value is determined by:

$$Z_{zd} = \left|\text{Mod}\left(\frac{3\dot{U}_s Z_{ABC}}{3\dot{U}_s + 2j\omega C \dot{U}_s Z_{ABC} + 3\dot{U}_{ABC} - \dot{U}_{ABC} Z_{ABC}}\right) - \text{Mod}\left(\frac{1}{j\omega C}\right)\right|,$$

where $U_s$ and $\psi$ are the amplitude and the phase of the output voltage respectively; $\dot{U}_s$ is the second compensation voltage; $Z_{ABC}$ is the ground transition impedance; $Z_{zd}$ is the impedance change amount protection constant value; $\dot{U}_{ABC}$ is a fault phase power supply voltage; C is a fault line to ground capacitance; || is an absolute value.

4. The method according to claim 1, wherein the zero-sequence impedance protection condition is that a zero-sequence impedance deviation during the first output duration and the second output duration is greater than or equal to an impedance variation protection constant value, wherein the zero-sequence impedance deviation is a difference between the maximum zero-sequence impedance and the minimum zero-sequence impedance;

the zero-sequence voltage protection condition is an obtained zero-sequence voltage setting value measured when the voltage source of the flexible grounding device exits from the voltage source compensation mode.

5. The method according to claim 4, wherein the impedance change amount protection constant value is set based on the sensitivity of isolated fault, wherein the impedance change protection constant value is determined based on the transition impedance to be detected.

6. The method according to claim 4, wherein the zero-sequence voltage setting value is greater than 8V.

7. The method according to claim 1, wherein the preset trip time delay is determined based on a mounting location of the zero-sequence impedance protection device in the line, when the preset trip time delay of the zero-sequence impedance protection device closer to a bus bar is greater than the preset trip time delay of the zero-sequence impedance protection device away from the bus bar, wherein a differential of the preset trip time delay is greater than or equal to 0.1 seconds.

8. The method according to claim 1, wherein the preset compensation time delay is greater than the preset trip time delay.

9. A line protection related apparatus for a flexible grounding system of a power distribution network, wherein the line protection related apparatus is configured to implement the steps:

outputting a first compensation voltage by a voltage source of a flexible grounding device of each line of a target power distribution network in the case where a ground fault occurs in the target power distribution network, wherein the first compensation voltage is opposite to a fault of a voltage corresponding to the ground fault;

detecting the ground fault by a zero-sequence impedance protection device to calculate the zero-sequence impedance of each line in real time;

after the first compensation voltage is output for a first output duration, adjusting the output voltage by the voltage source of the flexible grounding device to continuously output a second compensation voltage, and exiting from a voltage source compensation mode after the second compensation voltage is output for a second output duration;

calculating the zero-sequence impedance of each line in real time by the zero-sequence impedance protection device, wherein the zero-sequence impedance comprises a maximum zero-sequence impedance and a minimum zero-sequence impedance;

determining a fault line satisfying a zero-sequence impedance protection condition and a zero-sequence voltage protection condition according to the zero-sequence impedance by the zero-sequence impedance protection device, and cutting off the fault line to isolate the ground fault after a line breaker trips for a preset time delay; and when a case that the line satisfies the zero-sequence impedance protection condition and the zero-sequence voltage protection condition does not exist, the voltage source of the flexible grounding device continues to output the first compensation voltage after a preset compensation time delay, and comprising a flexible grounding device and a zero-sequence impedance protection device.

10. The line protection related apparatus according to claim 9, wherein the calculating the zero-sequence impedance of each line by the zero-sequence impedance protection device further comprises:

calculating the zero-sequence impedance of each line according to a zero-sequence impedance calculation formula by the zero-sequence impedance protection device, wherein the zero-sequence impedance calculation formula is $$Z_{0i} = \text{Mod}\left(\frac{\dot{U}_{0i}}{\dot{I}_{0i}}\right)$$

where $Z_{0i}$ is a zero-sequence impedance value of an $i^{th}$ zero-sequence protection device mounting point; $\dot{U}_{0i}$ is a zero-sequence voltage of the $i^{th}$ zero-sequence protection device mounting point; $\dot{I}_{0i}$ is a zero-sequence current of the $i^{th}$ zero-sequence protection device mounting point; Mod is a modulo function.

11. The line protection related apparatus according to claim 9, wherein the adjusting the output voltage by the voltage source of the flexible grounding device to continuously output the second compensation voltage further comprises:

adjusting an amplitude and/or a phase of the output voltage by the voltage source of the flexible grounding device to output the second compensation voltage, wherein the second compensation voltage is a plurality of different voltages in succession;

wherein the determination of the second compensation voltage is related to a ground transition impedance and an impedance change amount protection constant value, wherein the impedance change amount protection constant value is determined by:

$$Z_{zd} = \left|\text{Mod}\left(\frac{3\dot{U}_s Z_{ABC}}{3\dot{U}_s + 2j\omega C\dot{U}_s Z_{ABC} + 3\dot{U}_{ABC} - \dot{U}_{ABC}Z_{ABC}}\right) - \text{Mod}\left(\frac{1}{j\omega C}\right)\right|,$$

where $U_s$ and $\psi$ are the amplitude and the phase of the output voltage respectively; $\dot{U}_s$ is the second compensation voltage; $Z_{ABC}$ is the ground transition impedance; $Z_{zd}$ is the impedance change amount protection constant value; $\dot{U}_{ABC}$ is a fault phase power supply voltage; C is a fault line to ground capacitance; || is an absolute value.

12. The line protection related apparatus according to claim 9, wherein the zero-sequence impedance protection condition is that a zero-sequence impedance deviation during the first output duration and the second output duration is greater than or equal to an impedance variation protection constant value, wherein the zero-sequence impedance deviation is a difference between the maximum zero-sequence impedance and the minimum zero-sequence impedance;

the zero-sequence voltage protection condition is an obtained zero-sequence voltage setting value measured when the voltage source of the flexible grounding device exits from the voltage source compensation mode.

13. The line protection related apparatus according to claim 12, wherein the impedance change amount protection constant value is set based on the sensitivity of the isolated fault, wherein the impedance change protection constant value is determined based on the transition impedance to be detected.

14. The line protection related apparatus according to claim 12, wherein the zero-sequence voltage setting value is greater than 8V.

15. The line protection related apparatus according to claim 9, wherein the preset trip time delay is determined based on the mounting location of the zero-sequence impedance protection device in the line, the preset trip time delay of the zero-sequence impedance protection device closer to a bus bar being greater than the preset trip time delay of the zero-sequence impedance protection device away from the bus bar, the preset trip time delay differential being greater than or equal to 0.1 seconds.

16. The line protection related apparatus according to claim 9, wherein the preset compensation time delay is greater than the preset trip time delay.

17. The line protection related apparatus for the flexible grounding system of the power distribution network according to claim 9, wherein the zero-sequence impedance protection device comprises a voltage sensor unit, a current sensing unit, a control calculation unit and a trip unit, wherein the voltage sensing unit is configured to convert a high-voltage voltage into signals comprising a low-voltage voltage, a current and a frequency for collection and calculation; the current sensing unit is configured to convert a high-voltage zero-sequence current into signals comprising a low-voltage voltage, a current and a frequency for acquisition and calculation; the control calculation unit is configured to calculate a line zero-sequence impedance value and a difference between a maximum value and a minimum value of a zero-sequence impedance value and to determine whether to trip; and the trip unit controls a circuit breaker to close or break according to an instruction from the control calculation unit.

* * * * *